Dec. 7, 1926.
J. L. HOSFORD
GEAR SHIFTING LEVER LOCK
Filed Nov. 19, 1925
1,609,820
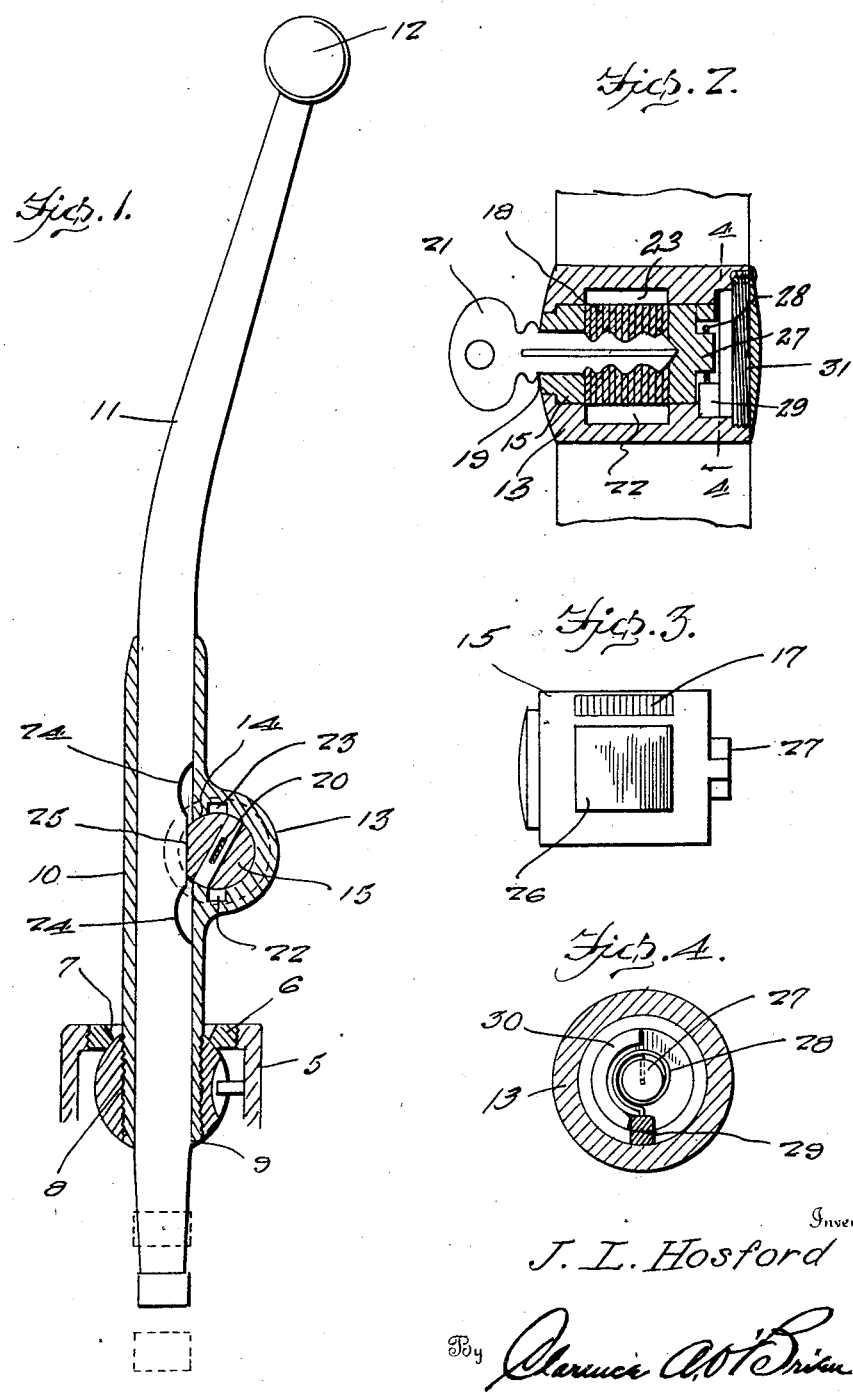
Inventor
J. L. Hosford Patented Dec. 7, 1926.

1,609,820

UNITED STATES PATENT OFFICE.

JOHN LESTER HOSFORD, OF BOONVILLE, MISSOURI.

GEAR-SHIFTING-LEVER LOCK.

Application filed November 19, 1925. Serial No. 70,073.

This invention relates generally to locks and has specific reference to a means whereby the shifting levers for the transmission mechanism of motor vehicles locked in or out of engagement with the cooperating shifting mechanism of the transmission.

The primary object of my invention is to provide a lock of this nature that may be readily associated with practically all types of vehicle engine transmissions and their cooperating shifting lever without any change whatever in the transmission mechanism and with little or no change of the shifting lever.

A further and important object is to provide a lock wherein the lever may be locked in or out of engagement with its cooperating shifting mechanism of the transmission in a simple and expeditious manner, the mechanism being so positioned with respect to the lever as to allow the insertion of the key in a quick manner and without reaching down to the floor board of the vehicle which is now generally necessary in devices of this character now in use.

With the foregoing and other objects in view as the nature of the invention is better understood from the following specification when considered with the accompanying drawings:—

My invention comprises the novel form, combination and arrangement of parts as shown in the drawing, wherein:—

Figure 1 is a detail vertical section through my improved locking mechanism, the shifting lever for the transmission being shown in side elevation, Fig. 2 is an enlarged horizontal section thru the lock casing and barrel, per se of the device, Fig. 3 is an elevation of the lock barrel, per se, and Fig. 4 is a detail vertical section taken substantially upon the line 4—4 of Fig. 2, for more clearly disclosing the means whereby the barrel is automatically moved to a locking position when turning pressure upon the control key is released.

Now having particular reference to the drawing, 5 designates the usual ball joint housing that projects upwardly from the transmission and usually extends through an opening in the floor board of the vehicle. The universal connection between this housing and the shifting lever employed in association with my locker mechanism, is of general conventional form, the same comprising the usual threaded disk 6 within the upper end of the housing through which is the usual opening 7, the upper and lower edges of which are beveled and through which project the top side of a ball 8, which in this instance, is formed with a vertical threaded bore 9 within which is threaded the lower end of a relatively elongated sleeve 10 that extends upwardly through the opening in the disk.

Slidable in opposite directions through this sleeve is a conventional form of shifting lever 11 adapted for engagement at its lower end, for association with shifting mechanism of any conventional form of transmission today employed in association with motor vehicles, the upper end thereof being provided with the usual handle knob 12.

In carrying out my invention, the sleeve 10 is formed adjacent its upper end with a transversely extending cylinder lock casing 13, the interior of which is in communication with the interior of the sleeve by reason of a cut-out 14.

Rotatably disposed within this casing 13 is a barrel 15, a portion of which will at all times project through the opening 14 into the sleeve 10 as shown in Fig. 1.

The barrel 15 is formed intermediate its ends with a relatively wide passageway 17 in which are disposed flat-like plungers 18 arranged loosely, and of a length equivalent to the transverse dimension of the passageway 17. One end of the barrel 15 is formed with a key slot 19 while the plungers 18 are formed intermediate their ends with slots 20 that are formed in predetermined un-alined relation more clearly shown in Fig. 2 in order that they may be slid entirely within the passageway 17 of the barrel through the medium of a key 21 in the opposite edges of which are notches and lugs in cooperating relation with the slots of the plungers, it being understood that when the barrel is in locking position within the casing and the key removed, the plungers will drop by gravity into a slot 22 formed interiorly upon the bottom wall of the barrel casing, in order that the barrel will be prevented from rotating when the key is removed.

The casing is also formed with the opposed slots 22 and 23 to accommodate the plungers 18 when the same are worked freely upwardly and downwardly within the barrel passage 17.

The shifting lever 11 is formed with a pair of spaced semi-circular notches 24 upon its rear side and within the sleeve 10 and the surface of the lever between said notches 24 is planed off as to provide a flat surface 25 in order that the lever may be slid past the lock barrel 15 during the locking or unlocking actuation of the device, said barrel being itself formed with a plane surface 26 intermediate its end so that when the barrel is moved to its unlocking position of Fig. 1, the same will engage the plane portion 25 of the lever for a purpose just described.

After the lever 11 has been raised or lowered to unlocking or locking position respectively, the barrel will turn automatically into locking position for obviously bringing the rounded surface of the barrel into engagement with one of the notches 24 for preventing sliding movement of the lever, further.

The end of the barrel 15 opposite from that to which is formed the key slot, is provided with a circular lug 27 to which is attached one end of a wire spring 28 that surrounds said lugs and the opposite end of which is attached to a lug 29 formed within the barrel casing directly beneath the lug, the nature of this spring being such as to normally rotate the barrel and to maintain the same in the position of Fig. 2 at which position the plungers 18 will automatically drop downwardly into the notch 22 when the key 21 is removed, and in this position, the rounded surface of the barrel will engage within either one of the notches 24 of the lever 11.

In order to limit the turning movement of the barrel in opposite directions, said barrel is formed with a semi-circular lug 30 in concentric relation with the lug 27, it being obvious that the opposite ends of said semi-circular lug will strike the lug 29 when the same is rotated, in either direction, for a purpose just mentioned.

Cooperating construction between the barrel 15 and casing 13 is such, as to prevent any longitudinal sliding movement of the barrel within the casing and furthermore said casing is so constructed at one end as to receive a suitable casing closing means 31 for preventing unauthorized access to the interior of the casing and consequently to the barrel.

It is believed that the construction, operation and advantages of a transmission lever lock of this character will be readily understood by those skilled in the art. Even though I have here shown and described the most preferred embodiment of the invention at which I am at this time familiar, it is nevertheless to be understood that minor changes may be made in the details of construction without affecting the spirit and scope of the appended claims.

Having thus described my invention, what I claim as new and desire to secure by Letters Patent is:—

1. In a device of the character described, the combination with a gear shifting lever adapted to be detachably associated at its lower end with the shifting mechanism of the vehicle transmission, and a sleeve through which the lever may be slid in opposite directions, of cooperating means between the lever and sleeve whereby the lever may be locked in or out of engagement with said shifting mechanism, said cooperating mechanism comprising vertically spaced notches formed upon the lever within the sleeve, a cylinder lock associated with the sleeve having a member for selective engagement within either of the spaced notches of the lever, key controlled means whereby the member may be moved out of engagement with the aforementioned spaced notches in order to permit the turning of the member in opposite directions, and automatic means for normally moving said member into engagement with a selective notch.

2. A device of the class described; the combination with a gear shifting lever adapted to be detachably associated at its lower end with the shifting mechanism of the vehicle transmission, and a sleeve through which the lever may be slid in opposite directions, of cooperating means between the lever and the sleeve whereby the lever may be locked in or out of engagement with said shifting mechanism, said cooperating mechanism comprising a pair of vertically spaced notches formed on the lever within the sleeve, the portion of the lever between said notches being flattened, a cylindrical lock associated with the sleeve, a locking barrel arranged in said cylinder lock, said barrel being provided with a flat face for cooperation with the flattened portion of said lever whereby the gear shift lever may be moved vertically in the sleeve, and means associated with the barrel for moving the same into locking engagement with either of said notches.

3. A device of the class described, the combination with a gear shifting lever adapted to be detachably associated at its lower end with the shifting mechanism of a vehicle transmission, and a sleeve through which the lever may slide in opposite directions, of cooperating means between the lever and the sleeve whereby said lever may be locked in or out of engagement with said shifting mechanism, said cooperating mechanism comprising a pair of vertically spaced notches formed on the lever within the sleeve, the portion of the lever between said notches being flattened, a cylindrical lock associated with the sleeve, a locking barrel arranged in said cylindrical lock, said barrel being provided with a flat face for cooperation with the flattened portion of the lever whereby the gear shift lever may be moved vertically in the sleeve, the cylinder lock including a casing, means for automatically moving the locking barrel into engagement with either of said notches, and means associated with the barrel for holding the same in locked engagement with either of said notches, said means comprising a series of tumblers slidably associated with the barrel, the casing being provided with a notch in which the ends of the slidable tumblers are adapted to be disposed when the barrel is in a predetermined position.

In testimony whereof I affix my signature.

JOHN LESTER HOSFORD.